Patented Sept. 4, 1951

2,567,132

UNITED STATES PATENT OFFICE 2,567,132

ANTHRAQUINONE CARBONYL HYDRAZINES

Frederic B. Stilmar, Wilmington, Del., assignor to E. I. du Pont de Nemours & Company, Wilmington, Del., a corporation of Delaware No Drawing. Application March 15, 1949, Serial No. 81,618

4 Claims. (Cl. 260—368)

This invention relates to the preparation of a new class of compounds of the anthraquinone series, and more particularly new acylated 1-amino- and 1-nitroanthraquinone-2-carbonyl hydrazines.

The anthraquinone vat dyes are known to be of particular value because of their excellent fastness properties, and, while a large range of colors has been produced commercially, there has not been produced a red dye in this class which will dye in the bright shades desirable and have the good fastness properties of dyes of this class in general. Several red dyes have been produced in the anthraquinone series, but they lack the strength or brightness or certain fastness properties which are particularly desirable and which usually identify the dyes of this class.

It is an object of the present invention to produce a class of new compounds which, although exhibiting dye properties in themselves, are particularly useful as intermediates in the preparation of bright red dyes of the anthraquinone vat dye class which exhibit excellent fastness properties and high tinctorial strength. A more specific object of the invention is to produce acylated 1-amino- and 1-nitroanthraquinone-2-carbonyl hydrazines from organic dicarboxylic acid chlorides of the formula:

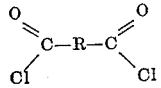

in which R stands for a radical of the group consisting of benzene, naphthalene, diphenyl and terphenyl radicals and the benzene, naphthalene, diphenyl and terphenyl groups containing from 1 to 4 halogen atoms of the group consisting of chlorine and bromine.

The compounds of this invention are prepared by reacting 1-aminoanthraquinone-2-carbonyl hydrazine or 1-nitroanthraquinone-2-carbonyl hydrazine with an acid chloride of an aromatic dicarboxylic acid of benzene, naphthalene, diphenyl or the terphenyl series, any of which may contain up to 4 halogen atoms. The reaction is preferably carried out at elevated temperatures in an inert solvent such as nitrobenzene or the chlorobenzenes, giving high yields of acylated hydrazines of the general formula:

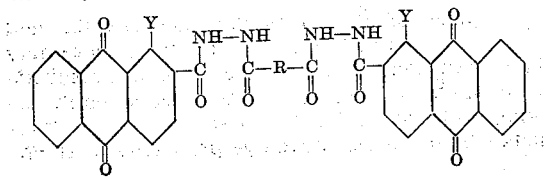

in which Y stands for a substituent of the group consisting of —$NH_2$ and —$NO_2$ and R has the same significance as given in the preceding formula.

The acylated anthraquinone hydrazines of this invention are particularly valuable in the manufacture of bis-anthraquinone-oxdiazoles which are bright red-to-scarlet vat dyes. This latter class of dyes is produced by subjecting the bis-acylated hydrazides to the action of acid condensing agents such as thionyl chloride, phosphorus oxychloride, p-toluene sulfonic acid, etc., whereby ring closure of the hydrazide groups to oxdiazole rings is effected. These dyes are more particularly disclosed and claimed in co-pending application Serial No. 81,619, filed March 15, 1949, now U. S. Patent 2,511,018.

The following examples are given to illustrate the invention. The parts used are by weight, unless otherwise specified.

Example 1

Thirty-one (31) parts of 1-nitroanthraquinone-2-carbonyl hydrazine, 10 parts of terephthalyl chloride and 800 parts of nitrobenzene are heated to 165°–170° C. for two hours, or until the evolution of hydrogen chloride is complete. The colorless product is filtered off, washed with benzene and dried. It has a melting point of from 299° to 304° C., and may be represented by the formula:

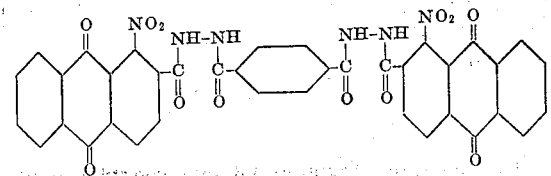

It dyes cotton from an alkaline hydrosulfite vat in weak red shades that change to blue-violet on treatment with alkali.

Example 2

Five (5) parts of isophthalic acid is converted to the acid chloride by heating with 250 parts of trichlorobenzene and 10 parts of thionyl chloride under reflux at 150° C. until solution is complete; then the excess thionyl chloride is removed by air blowing. To the resulting solution 20.5 parts of 1-nitroanthraquinone-2-carbonyl hydrazine are added and the temperature maintained at 165°–170° C. for four hours.

The resulting colorless product dyes cotton from an alkaline hydrosulfite vat in weak red shades. It has the formula:

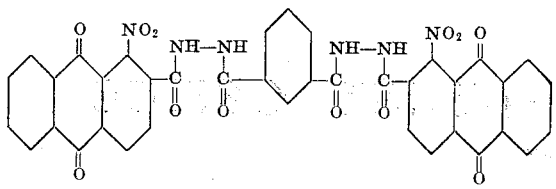

Example 3

Five and four-tenths (5.4) parts of naphthalene-1,4-dicarboxylic acid is converted to the acid chloride by heating with 10 parts of thionyl chloride and 200 parts of nitrobenzene at 150°-155° C. for four hours. The excess thionyl chloride is removed by air blowing, and 17 parts of 1-nitroanthraquinone-2-carbonyl hydrazine are added. After heating at 160°-165° C. for several hours, the resulting almost colorless particles are filtered off, washed with benzene and dried. This product has the formula:

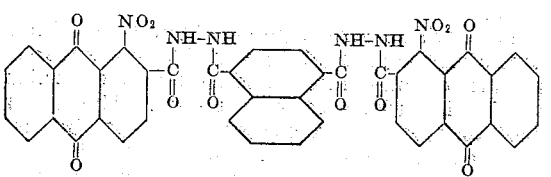

Example 4

Five (5) parts of diphenyl-4,4'-dicarboxylic acid is converted to the acid chloride by heating with 10 parts of thionyl chloride and 200 parts of nitrobenzene at 145° C. for ten hours. By that time solution is complete, and the excess thionyl chloride is removed by air blowing.

Twelve and three-tenths (12.3) parts of 1-nitroanthraquinone-2-carbonyl hydrazine are added to the solution, and after heating at 160°-170° C. for several hours the resulting product, as microscopic needles, is isolated by filtration, washed with benzene and dried. It has a melting point of 308° C. and the formula:

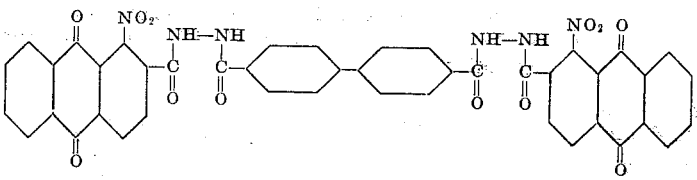

In place of diphenyl-4,4'-dicarboxylic acid, p-terphenyl-4,4''-dicarboxylic acid may be used to give the corresponding p-terphenyl compound having similar reactivity and chemical properties.

Example 5

Ten (10) parts of chloroterephthalic acid is converted into the dicarbonyl chloride by refluxing with 25 parts of thionyl chloride, 400 parts of o-dichlorobenzene and ½ part of pyridine at 130°-140° C. for three hours. The excess thionyl chloride is removed by a current of air, and there is added 34.1 parts of 1-nitroanthraquinone-2-carbonyl hydrazine.

After heating at 160°-170° C. for two hours, the formation of the white bis-acylated hydrazine is complete. The product, which is obtained in high yields, has the formula:

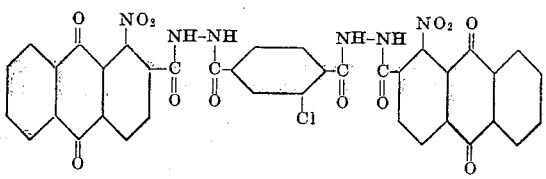

Example 6

One (1) part of terephthalyl chloride, 5.6 parts of 1-aminoanthraquinone-2-carbonyl hydrazine and 100 parts of nitrobenzene are heated to 160°-170° C. for two hours. The red crystalline product is filtered off, washed with benzene and dried. It is obtained in good yields and has the formula:

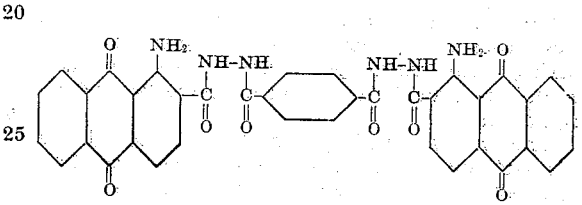

By the condensation of other dicarboxylic acid chlorides with 1-aminoanthraquinone-2-carbonyl hydrazine, the bis-acylated hydrazide results. For example, the acid chlorides from naphthalene-1,5-dicarboxylic acid or the 2,6-isomer, anthracene-9,10-dicarboxylic acid and anthraquinone-2,6(7)-dicarboxylic acids may be used.

Example 7

Three and four-tenths (3.4) parts of tetrachloroterephthalyl chloride, 7 parts of 1-nitroanthraquinone-2-carbonyl hydrazine and 150 parts of ortho-dichlorobenzene are slowly heated to 160°-170° C., and the temperature maintained for two hours. The resulting mass is filtered and the precipitate washed with benzene and dried. The tetrachloro compound is obtained in good yields and has the formula:

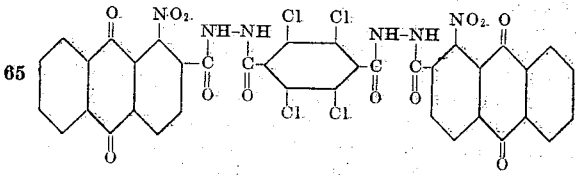

In place of the particular dicarboxylic acid chlorides used in the above examples, there may be substituted other chlorine or bromine substituted dicarboxylic acids of the benzene, naphthalene, diphenyl or terphenyl series to give products which likewise have dye properties in themselves but which are more particularly valuable for intermediates in the preparation of oxdiazole dyes as more particularly described above. As further illustrative of the dicarboxylic acid chlorides which may be employed, may be mentioned:

5,8 - dichloronaphthalene - 1,4 - dicarboxylic acid chloride
4,8 - dichloronaphthalene - 1,5 - dicarboxylic acid chloride
4,4'-dichlorobiphenyl-3,3'-dicarboxylic acid chloride
3,3'-dichlorobiphenyl-4,4'-dicarboxylic acid chloride
5-bromonaphthalene-1,4-dicarboxylic acid chloride
5-bromobenzene-1,3-dicarboxylic acid chloride, and
Bromoterephthalic acid chloride.

It will be obvious that only those dicarboxylic acids or acid chlorides can be employed which do not form cyclic imides with hydrazines. In other words, the terephthalyl chloride, the isophthalyl chloride and their chloro or bromo derivatives, the 1,3-, 1,4-, 1,5-, 1,6- or 1,7-naphthalene dicarboxylic acids, and any of the diphenyl and terphenyl dicarboxylic acids which have the carboxylic acid groups separated by at least three carbon atoms if they are both on the same benzene ring, or separated by at least 5 carbon atoms if they are on different benzene rings in the molecule, may be employed. In other words, the o-benzene dicarboxylic acid, the naphthalene-1,8-dicarboxylic acid and the 2,2'-diphenyl or the 2,2'-terphenyl dicarboxylic acid which form cyclic imides with hydrazines, are not satisfactory for producing the compounds of the present invention.

The compounds of this invention may be ring closed without isolation from the nitrobenzene or other solvent mass by adding the acid condensing agent such as thionyl chloride, and continuing the heating at temperatures of from 160°-170° C. to produce the oxdiazoles as more particularly disclosed in my co-pending application Serial No. 81,619 filed March 15, 1949, now U. S. Patent 2,511,018.

As illustrated in the above examples, the dicarboxylic acid chloride may be formed as a preliminary step in the preparation of the condensation product without isolation from the organic solvent in which it is formed, although where preferred it may be first prepared in any desired manner and, after isolation, condensed with the anthraquinone-2-carbonyl hydrazine. It will be obvious that other acid halides can be employed in place of the acid chloride.

By vatting the nitro compounds produced from the 1-nitroanthraquinone-2-carbonyl hydrazine with sodium hydrosulfite and caustic, they may be converted to the corresponding amino compounds. Usually, however, it will be found desirable to effect ring closure of the nitro compounds prior to their reduction to the amines.

I claim:
1. The anthraquinone carbonyl hydrazines of the general formula:

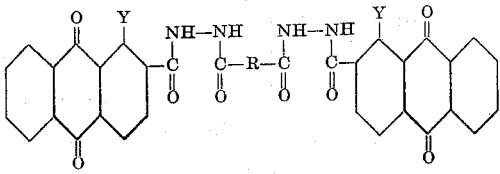

in which R stands for a radical of the group consisting of 1,4-phenylene, 1,4-naphthylene and 4,4'-diphenylene radicals and their halogen derivatives which contain from 1 to 4 halogen atoms of the group consisting of chlorine and bromine, and in which Y stands for a substituent of the group consisting of —NH$_2$ and —NO$_2$.

2. The anthraquinone carbonyl hydrazine of the formula:

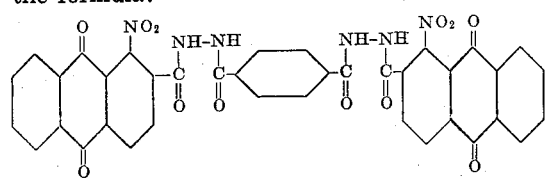

3. The anthraquinone carbonyl hydrazine of the formula:

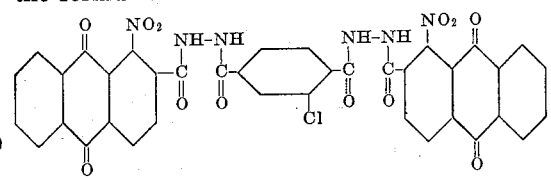

4. The anthraquinone carbonyl hydrazine of the formula:

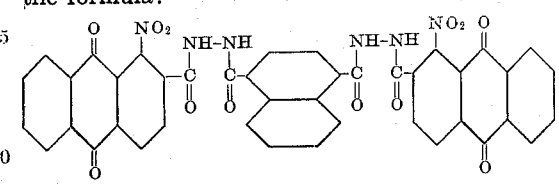

FREDERIC B. STILMAR.

REFERENCES CITED

The following references are of record in the file of this patent:

UNITED STATES PATENTS

| Number | Name | Date |
| --- | --- | --- |
| 2,464,831 | Stilmar | Mar. 22, 1949 |